(12) United States Patent
Chamberot et al.

(10) Patent No.: US 11,151,338 B2
(45) Date of Patent: Oct. 19, 2021

(54) SECURING A TRANSACTION BY MEANS OF A SMART CARD AND SMART CARD

(71) Applicant: IDEMIA FRANCE, Courbevoie (FR)

(72) Inventors: Francis Chamberot, Courbevoie (FR); Arezki Rezzeli, Courbevoie (FR)

(73) Assignee: IDEMIA FRANCE, Courbevoie (FR)

( * ) Notice: Subject to any disclaimer, the term of this patent is extended or adjusted under 35 U.S.C. 154(b) by 0 days.

(21) Appl. No.: 16/716,611

(22) Filed: Dec. 17, 2019

(65) Prior Publication Data
US 2020/0193101 A1 Jun. 18, 2020

(30) Foreign Application Priority Data
Dec. 18, 2018 (FR) ........................................ 1873214

(51) Int. Cl.
*G06K 7/10* (2006.01)
*G06F 8/65* (2018.01)

(52) U.S. Cl.
CPC ........... *G06K 7/10297* (2013.01); *G06F 8/65* (2013.01)

(58) Field of Classification Search
CPC .............................. G06K 7/10297; G06F 8/65
See application file for complete search history.

(56) References Cited

U.S. PATENT DOCUMENTS

| 9,483,667 | B1 * | 11/2016 | Roth | G06K 7/0004 |
|---|---|---|---|---|
| 2007/0225038 | A1 * | 9/2007 | Takeda | H04L 69/18 |
| | | | | 455/558 |
| 2011/0140841 | A1 * | 6/2011 | Bona | G07F 7/0846 |
| | | | | 340/5.83 |
| 2014/0283034 | A1 * | 9/2014 | Duval | H04N 21/63345 |
| | | | | 726/22 |
| 2014/0365776 | A1 * | 12/2014 | Smets | H04L 9/3066 |
| | | | | 713/171 |
| 2019/0139351 | A1 | 5/2019 | Chambero et al. | |

FOREIGN PATENT DOCUMENTS

| FR | 3051064 A1 | 11/2017 | |
|---|---|---|---|
| WO | WO-2017194862 A1 * | 11/2017 | G06Q 20/409 |

OTHER PUBLICATIONS

ISO/IEC 7816-1, "Identification cards—Integrated circuit cards—Part 1: Cards with contacts—Physical characteristics," Feb. 15, 2011.
ISO/IEC 7816-2, "Identification cards—Integrated circuit cards—Part 2: Cards with contacts—Dimensions and location of the contacts," Oct. 15, 2007.
ISO/IEC 7816-3, "Identification cards—Integrated circuit cards—Part 3: Cards with contacts—Electrical interface and transmission protocols," Nov. 1, 2006.

(Continued)

*Primary Examiner* — Laura A Gudorf
(74) *Attorney, Agent, or Firm* — Nixon & Vanderhye

(57) ABSTRACT

Disclosed is a method of managing a smart card configured for securing a transaction with an external device via a card reader, the method including the following steps: incrementing at least one command counter of commands received by the smart card during a transaction; and depending on the current value of the at least one counter and a command profile, implementation of a smart card management command.

19 Claims, 2 Drawing Sheets

(56) References Cited

OTHER PUBLICATIONS

ISO/IEC 7816-4, "Identification cards—Integrated circuit cards—Part 4: Organization, security and commands for interchange," Apr. 15, 2013.
ISO/IEC 7816-5, "Identification cards—Integrated circuit cards—Part 5: Registration of application providers," Dec. 1, 2004.
ISO/IEC 7816-6, "Identification cards—Integrated circuit cards—Part 6: Interindustry data elements for interchange," Jun. 15, 2016.
ISO/IEC 7816-7, "Identification cards—Integrated circuit(s) cards with contacts—Part 7: Interindustry commands for Structured Card Query Language (SCQL)," Mar. 1, 1999.
ISO/IEC 7816-9, "Identification cards—Integrated circuit cards—Part 8: Commands and mechanisms for security operations," Nov. 1, 2016.
ISO/IEC 7816-9, "Identification cards—Integrated circuit cards—Part 9: Commands for card management," Dec. 2017.
ISO/IEC 7816-10, "Identification cards—Integrated circuit(s) cards with contacts—Part 10: Electronic signals and answer to reset for synchronous cards," Nov. 1, 1999 (corrected and reprinted Feb. 15, 2000).
ISO/IEC 7816-11, "Identification cards—Integrated circuit cards—Part 11: Personal verification through biometric methods," Dec. 2017.
ISO/IEC 7816-12, "Identification cards—Integrated circuit cards—Part 12: Cards with contacts—USB electrical interface and operating procedures," Oct. 1, 2005.
ISO/IEC 7816-13, "Identification cards—Integrated circuit cards—Part 13: Commands for application management in a multi-application environment," Mar. 15, 2007.
ISO/IEC 7816-14, "Identification cards—Integrated circuit cards—Part 15: Cryptographic information application," May 15, 2015.
ISO/IEC 14443-1, "Cards and security devices for personal identification—Contactless proximity objects—Part 1: Physical characteristics," Apr. 2018.
ISO/IEC 14443-2, "Identification cards—Contactless integrated circuit cards—Proximity cards—Part 2: Radio frequency power and signal interface," Jul. 15, 2016.
ISO/IEC 14443-3, "Cards and security devices for personal identification—Contactless proximity objects—Part 3: Initialization and anticollision," Jul. 2018.
ISO/IEC 14443-4, "Cards and security devices for personal identification—Contactless proximity objects—Part 4: Transmission protocol," Jul. 2018.
ISO/IEC 15693-1, "Cards and security devices for personal identification—Contactless vicinity objects—Part 1: Physical characteristics," Jul. 2018.
ISO/IEC 15693-2, "Identification cards—Contactless integrated circuit cards—Vicinity cards—Part 2: Air interface and initialization," Dec. 15, 2006.
ISO/IEC 15693-3, "Identification cards—Contactless integrated circuit cards—Vicinity cards—Part 3: Anticollision and transmission protocol," Apr. 15, 2009.
ISO/IEC 15693-3, "Identification cards—Contactless integrated circuit cards—Vicinity cards—Part 3: Anticollision and transmission protocol," Amendment 2: Clarification of use of Data Elements, Aug. 15, 2015.
ISO/IEC 15693-3, "Identification cards—Contactless integrated circuit cards—Vicinity cards—Part 3: Anticollision and transmission protocol," Amendment 3: Extended VICC memory organisation, Jun. 15, 2015.
ISO/IEC 15693-3, "Identification cards—Contactless integrated circuit cards—Vicinity cards—Part 3: Anticollision and transmission protocol," Amendment 4: Security framework, May 2015.
FR Search Report, dated Jun. 25, 2019, from corresponding FR application No. 1873214.
Wolfgang et al., "Smart card handbook", fourth edition, 2010, Wiley, Chichester, West Sussex, U.K. XP055411264, ISBN: 978-0-470-74367-6.

* cited by examiner

[Fig. 1]
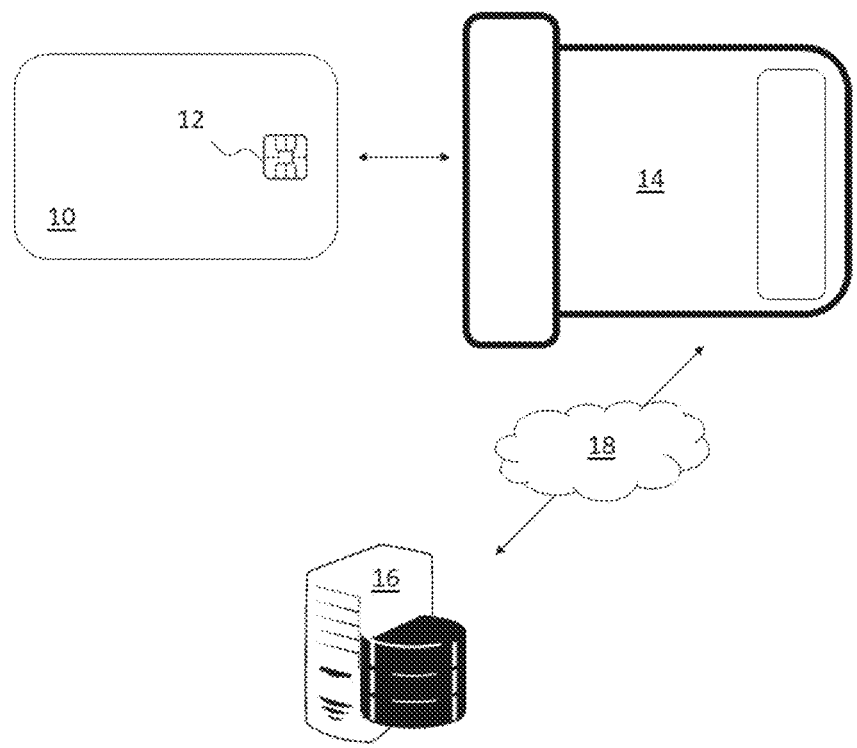
[Fig. 2]
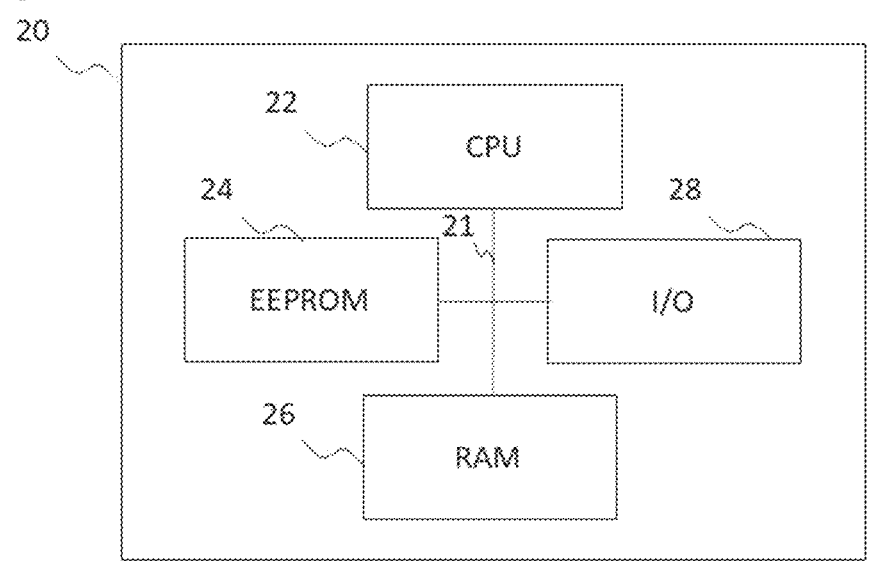

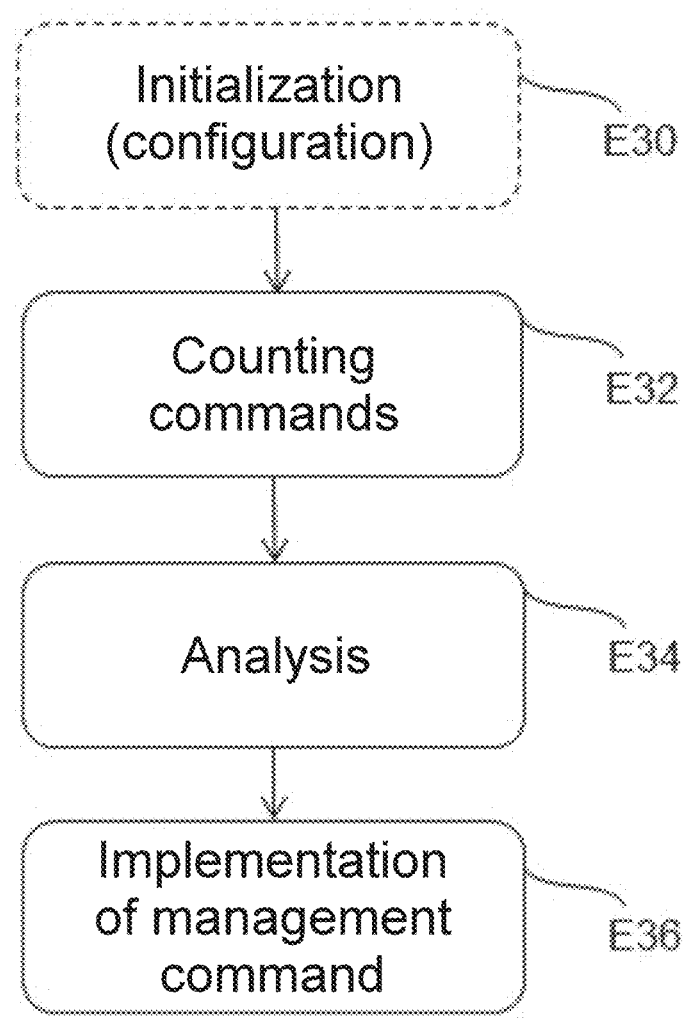
[Fig. 3]

SECURING A TRANSACTION BY MEANS OF A SMART CARD AND SMART CARD

TECHNICAL FIELD

The invention lies in the field of transactions involving secure devices such as smart cards comprising a secure element. It concerns, in particular, a method for managing a smart card configured for securing a transaction, and such a smart card.

PRIOR ART

The present invention relates to secure transactions of the bank transaction type, involving a security device such as a smart card. For example, it relates to a bank card compliant with the EMV (Europay Mastercard Visa) standard configured for implementing EMV transactions. According to other examples it is a voting card configured for performing electronic voting transactions, a personal card configured for giving access to sensitive data of the personal identity data type. It is, for example, a health card, an identity card, a passport or a driving license.

To do this, the smart card typically comprises a secure element configured for communicating with a card reader (e.g. a terminal) via a communication interface, e.g. compliant with the ISO 7816 standard (contact communication) or ISO14443 or NFC/ISO 15693 standards (contactless communication). Thus, according to this standard, the secure element and the reader exchange APDU (Application Protocol Data Unit) frames. The APDU frames sent by the reader constitute commands.

In an EMV transaction, the secure element performs a number of commands, e.g. for selecting a payment application, providing the application with information relevant to the initiation of the transaction or providing information on the smart card to the card reader for reading certain data from the smart card, or else for generating a cryptogram in order to sign the transaction. Other types of commands may be executed.

Executed commands differ slightly depending on whether the EMV transaction is performed online or offline. It is recalled that during an online transaction, the issuing entity of the card (typically the associated bank establishment) is consulted in order to authorize or not authorize the transaction. On the contrary, in an offline transaction, the issuing entity is not consulted. Verification criteria stored locally (typically on the smart card) are evaluated by the card reader for authorizing or not authorizing the transaction.

However, card readers and the cards themselves may be a source and/or a target of fraud. The fact that an element is a target or source of fraud depends on who the victim is (the card holder or the third party with which the card is making a transaction).

For example, a smart card or a reader may be hacked for the purpose of forcing an offline transaction in order to illegally credit a bank account. To do this, an attacker may, for example, repeatedly send the same command to the smart card in order for it to execute it several times and study its behavior in order to refine their attack.

In most cases, the smart card will not consider this situation as abnormal and will continue to respond without reacting. Such an attack is therefore difficult to detect.

Moreover, a bad version of configuration or bad customization of the smart card or the reader may affect the performance of the card or the reader or cause the disclosure of sensitive information. These situations are also difficult to detect.

There is therefore a general need to improve the detection of abnormal or undesirable behaviors linked to the smart cards used for performing secure transactions.

DISCLOSURE OF THE INVENTION

The object of the present invention is thus to remedy at least one of these drawbacks.

In this context, a first aspect of the invention relates to a method of managing a smart card configured for securing a transaction with an external device via a card reader, the method being characterized in that it comprises the following steps:
  incrementing at least one command counter of commands received by the smart card during a transaction;
  depending on the current value of the at least one counter and a command profile, implementation of a smart card management command.

Correspondingly, a second aspect of the invention relates to a smart card configured for securing a transaction with an external device via a card reader, the smart card being characterized in that it comprises a secure element configured for implementing the following steps:
  incrementing at least one command counter of commands received by the smart card during a transaction;
  depending on the current value of the at least one counter and a command profile, implementation of a smart card management command.

The invention thus claimed makes it possible to improve the detection of abnormal or undesirable behaviors linked to the smart cards used for performing secure transactions.

Indeed, the implementation of a counter or counters linked to the commands received by the card makes it possible to identify and qualify the problems more thoroughly and precisely than in the prior art. This makes it possible to manage the card appropriately when deviant behaviors of the expected profile are identified.

Typically, the command profile defines the nature of the counter or counters, one or more values or proportions or limit differences between different counters, optionally one or more management commands to be implemented according to the value of the counter or counters.

Other features of the method and the smart card according to embodiments of the invention are described in the dependent claims.

In some embodiments, the external device may be the card reader.

In some embodiments, the step of incrementing at least one command counter consists in counting all the commands received by the smart card during the transaction.

In some embodiments, the incrementing step implements multiple counters, each counter being associated with a command of a given type from a plurality of types of commands received by the smart card during the transaction.

In some embodiments, the profile defines proportions or limit differences between the values of the different counters.

In some embodiments, the profile defines, for at least one counter, a limit number of commands received by the smart card.

In some embodiments, the method comprises a step of writing each command received by the smart card during the transaction into a dedicated memory register.

In some embodiments, the method comprises a step of writing commands and/or transactions when at least one command counter exceeds a certain limit, into a dedicated memory register.

In some embodiments, the management command consists in implementing a security countermeasure in the smart card.

In some embodiments, the security countermeasure consists in interrupting the transaction or recording a dedicated indicator in a non-volatile memory of the smart card or in temporarily or permanently blocking the use of the smart card.

The dedicated indicator may trigger other types of actions.

In some embodiments, the smart card management command comprises updating the command profile or at least one application data item.

For example, the updating of the profile consists in updating the limits associated with the counters, and/or the management command to be implemented in the event of moving away from these limits. By way of illustration, the updating may consist in replacing the writing in memory of a lock card flag by the writing into memory of a kill card flag in the event of exceeding a limit associated with a given counter.

For example, the updating of at least one application data item consists in updating the maximum amount of bank transactions.

In some embodiments, the method comprises a step of sending, to a third entity, information relating to the current value of the counter or counters.

In one embodiment, this information is the current value of the counter or counters.

In another embodiment, this information indicates whether the current value of the counter or counters is below or above the limit value.

In some embodiments, the smart card management command is instructed by the third entity in response to the information.

In some embodiments, the management command consists in sending an update command to the card reader.

In some embodiments, the method comprises an initial step of configuring the command profile.

In some embodiments, the step of updating or configuring the profile comprises receiving and executing at least one command of a configuration or update script defining the command profile or at least one application data item.

In some embodiments, the method comprises a step of identifying a removal of the card from the smart card reader before the end of the transaction.

For example, such a removal is identified when a counter of completed transactions has too low a value with respect to the number of initiated transactions.

The particular advantages, aims and features of the smart card are similar to those of the aforementioned method.

In a particular embodiment, the different steps of the aforementioned method are determined by computer program instructions.

Accordingly, the invention is also aimed at a computer program on an information medium, this program being capable of being implemented by a microprocessor, this program comprising instructions suitable for implementing the steps in the method as mentioned above.

This program may use any programming language, and be in the form of source code, object code, or intermediate code between source code and object code, such as in a partially compiled form, or in any other desirable form.

The invention is also aimed at an information medium capable of being read by a microprocessor, and comprising computer program instructions as mentioned above.

The information medium may be any entity or device capable of storing the program. For example, the medium may comprise a storage means, such as a ROM, e.g. a micro-circuit ROM, or a magnetic recording means, e.g. a hard disk, or a flash memory.

Furthermore, the information medium may be a transmissible medium such as an electrical or optical signal, which may be routed via an electrical or optical cable, by radio or by other means. The program according to the invention may in particular be downloaded on a storage platform of an Internet type network.

Alternatively, the information medium may be an integrated circuit incorporating the program, the circuit being suitable for executing or for being used in the execution of the method in question.

The aforementioned information medium and computer program have features and advantages similar to the method that they implement.

BRIEF DESCRIPTION OF THE DRAWINGS

Other features and advantages of the invention will also become apparent in the following description, illustrated by the attached figures which illustrate embodiments thereof without any limiting character.

FIG. 1 represents a context in which a method in accordance with the embodiments of the invention may be implemented.

FIG. 2 represents an example of architecture for a device in accordance with embodiments of the invention.

FIG. 3 represents, in the form of a flowchart, the general steps of a method in accordance with embodiments of the invention.

DETAILED DESCRIPTION

FIG. 1 represents a context in which a method in accordance with the embodiments of the invention may be implemented.

In this example, a secure device 10 is configured for communicating with a reader 14. The reader 14 is itself configured for communicating with a remote third party entity 16, via a communication network 18.

The secure device 10 is, for example, a smart card comprising a secure element 12. The reader 14 is, for example, a smart card reader or a terminal. The remote third entity 16 is, for example, a server.

In a particular example, the elements represented in FIG. 1 are configured for implementing a banking transaction, e.g. an EMV transaction. Thus, the smart card 10 is, for example, an EMV bank card, the reader 14 is an EMV contact or contactless payment terminal and the server 16 is a bank server.

In a particular example, the smart card 10 is configured for implementing multiple applications selectable, for example, by the user. It is, for example, a payment application and a loyalty application. According to the selected mode or modes, the card may function as a payment card and/or as a loyalty card. Other applications may be envisaged.

FIG. 2 represents an example of architecture for a secure device in accordance with embodiments of the invention, such as the device 10 in FIG. 1.

In this example, the architecture 20 comprises a communication bus 21 to which the following are connected:

- a processing unit—or microprocessor—22 denoted by CPU (Central Processing Unit);
- one or more non-volatile memories 24, e.g. an EEPROM (Electrically Erasable Programmable Read Only Memory) which may constitute a medium within the meaning of the invention, i.e. which may comprise a computer program comprising instructions for implementing a method according to the invention; this non-volatile memory may as a variant be a flash memory;
- a random access memory or cache memory or volatile memory 26, e.g. a RAM (Random Access Memory) comprising registers suitable for recording variables and parameters created and modified during the execution of the aforementioned program; during the implementation of the invention, the instruction codes of the program stored in non-volatile memory (e.g. EEPROM or flash) are loaded into RAM memory with a view to being executed by the processing unit CPU; and
- a communication interface 28 suitable for transmitting and receiving data, e.g. with the reader 14.

The communication bus allows communication and interoperability between the different elements included in the device or connected thereto. The representation of the bus is not restrictive and, in particular, the processing unit is capable of communicating instructions to any element of the device directly or via another element of this device.

As will be described in more detail with reference to FIG. 3, a secure device compliant with one of the embodiments is configured for securing a transaction with a card reader with the aid of one or more command counters of commands (e.g. APDU commands) received by the card during a transaction.

FIG. 3 represents, in the form of a flowchart, general steps of a method in accordance with embodiments of the invention.

In a first optional step E30, at least one command counter is configured in the smart card.

This configuration step is, for example, performed with the aid of a TLV (Tag Length Value) structure well known to the person skilled in the art. It consists, for example, in indicating the type of commands to be counted, the expected command profile, and a management command to be implemented in the event of any discrepancy and/or conformity with respect to the profile. For example, this profile may define a limit value for the counter or counters. As a variant, the profile may define a proportion to be respected between different types of APDU commands. For example, for optimal operation it is expected that there has only been a single command GET RESP (Get response) per SELECT command (command which makes it possible to select the application) received by the card.

According to some embodiments, step E30 may comprise receiving and executing at least one command from a configuration script. This configuration script describes a sequence of commands to be implemented for configuring the card. Said at least one command from the configuration script is, for example, received from a third entity, e.g. the bank server 16 in FIG. 1. As a variant, it may be the issuing entity of the card if this is different.

This step E30 is optional and the command counter may have been preconfigured during the customization of the card by the card issuer. The preconfiguration may be a default configuration and may be modified thereafter according to the needs or problems identified thanks to the present method.

During a step E32, a transaction is implemented between the card and the reader, after establishing the necessary connection between these two entities. During this transaction, the card counts the number of APDU commands that it receives. In other words, at each reception of a command by the smart card, it increments the current value of a command counter of commands (possibly of several commands).

The value of the counter or counters is stored in memory, e.g. in the EEPROM memory 24 of FIG. 2.

According to a first embodiment, the total number of APDU commands received and/or executed during the transaction is counted.

Advantageously, as the profile of a transaction, in terms of exchanged commands is known, it is possible to quickly detect an anomaly.

In the case of a multi-application card (that is to say which is able to implement several different applications), the profile of a transaction depends on the application implemented. For example, if the card implements the loyalty application during the transaction, the number of commands received by this application during a typical transaction is also known, so that it is also possible to detect an anomaly during a complex transaction.

By way of illustration, if the counter counts a much higher number of commands during a transaction, this may be indicative of a replay attack aimed at studying the behavior of the card.

According to another illustration, if the counter counts a lower number of commands during a transaction, this may mean that the card was removed or disconnected from the reader (contactless mode) before the end of the transaction. Such a removal of the card may present a security problem since it may prevent the implementation of a security countermeasure such as blocking the card.

An unusual number of commands may as a variant be attributed to a problem of customization or configuration of the card. Similarly, an analysis of the counter of different cards using the same reader may reveal a software problem (updating or configuration) in the reader.

According to a second embodiment, multiple counters are used, each counter counting the number of APDU commands of a certain type.

For example, one of the counters may count the number of transactions (e.g. ATC or Application Transaction Counter), while another counter may count the number of Get Response commands received by the card. A detailed example is described below.

During a step E34, the value of the counter or counters is analyzed with respect to the expected profile.

According to a first embodiment, the value of each counter is compared with an associated limit value in the command profile.

According to a second embodiment, step E34 consists in analyzing the proportion between the different commands with respect to the expected profile.

For example, this step consists in comparing the quotient of the counter associated with a given command by a counter associated with another command to a threshold. As a variant, this step consists in comparing the remainder of the Euclidean division of the counter associated with a command by a counter associated with a different command to a threshold.

According to a third embodiment, step E34 consists in comparing the difference between the counters associated with different commands to a threshold.

During a step E36, according to the result of step E34, a card management command is implemented. For example, the management command may consist in sending information relating to the current value of the counter or counters to the remote server 16 during the next connection, e.g. during the next online transaction. For example, this information is the result of the analysis E34 and/or the analyzed values directly. In response, the server may order the implementation of another card management command, e.g. a security countermeasure, in response to the number of commands counted or the result of the analysis E34. As a variant, the server 16 or the smart card may send the reader an update command.

According to one variant, the smart card could systematically send the information relating to the counter(s) to the remote server 16 and the latter could implement step E34 remotely.

According to another example, the management command may consist in creating a log in a dedicated memory register, e.g. the EEPROM 24, indicating the commands received and/or listing the transactions for which the number exceeds a certain limit. This log may also indicate information relating to the context of execution of said commands and/or transactions, e.g. the communication interface or the amount of the transaction. In practice, each command received and executed by the smart card during a transaction may be written into the log, and this during all transactions. When the log is full, the transactions that went well (limit not reached) are deleted in favor of the commands received by the card during a new transaction.

As a variant, the management command may consist of a security countermeasure, e.g. the issuance of an exception aimed at interrupting the transaction, blocking the card ("lock card") or writing a "kill card" flag into the memory of the card. It is recalled that lock card and kill card make it possible to block the card sometimes reversibly (lock card), and sometimes permanently and irreversibly (kill card). Other types of countermeasures may be implemented.

According to another variant, the management command may consist in updating the profile involved in step E30.

This update may be based on an update script operating similarly to the configuration script.

The management command may also consist in not executing a received command when the limit number is reached for this type of command.

By way of illustration only, an example of configuration is set out below:

Tag ID counter 1/Len 1/Get response/Max Ins1/React Ins1

Tag ID counter 2/Len 2/Read Records/Max Ins2/React Ins2

Tag ID counter 3/Len 3/Put data or Update records/Max Ins3/React Ins3

Tag ID counter 4/Len 4/I payment commands IDs/Max Ins4/React Ins4

Tag ID counter 5/Len 5/Number of interrupted transactions/Max Ins5 /React Ins5

Tag ID counter 6/Len 6/Offline transaction/Max Ins6/ React Ins6

In this example, six counters are used.

The variable 'Tag ID counter x' identifies the counter x where x may bere take the values 1 to 6.

The variable 'Lenvx' indicates the length of the data associated with the counter x, including the identifier of the command, the threshold associated with the counter and the identifier of the associated management command.

The variable 'React Ins x' identifies the management command to be implemented.

The variable 'Max Ins x' indicates the maximum number of commands for the counter x beyond which a management command is implemented.

The first counter counts the number of APDU Get Response commands. This counter makes it possible, for example, to verify the adequacy of a volume of exchanged data and the size of buffers used for this. Indeed, when the size of a communication buffer is too small with respect to the volume of data to be exchanged, multiple Get Response commands are required for obtaining/sending all the data. Too high a number of Get Response commands will therefore make it possible to identify an inappropriate buffer size.

The second counter counts the number of APDU Read Records commands. This counter may reveal that the reader will consult the registers of the card when it is not necessary, which may indicate a problem with the configuration of the reader.

The third counter counts the number of script updating commands. This counter makes it possible, for example, to verify the consistency between the commands sent by the server 16 via the reader to the card and the commands actually received by the card. Any additional command, e.g. sent by an attacker for studying the behavior of the card, is then identified.

The fourth counter may count, for example, one of the following commands: Get_processing_option (GPO), Generate application cryptogram (GAC), or External Authenticate (EA, Ext. Auth). Thus, this fourth counter may, for example, count the number of commands for generating a payment cryptogram according to a specified method. It is provided in some payment standards that a payment transaction may be validated by the card by means of a cryptogram that can be generated according to various more or less successful methods compared with each other. A command may be provided for each of the cryptogram generating methods. Thus, this counter makes it possible, for example, to verify if there is an excessive use of a cryptogram generating method, e.g. a method which is less reliable and/or effective than others. A card or a terminal configuration problem may thus be identified.

The fifth counter counts the number of transactions that have not been completed, e.g. because of the removal of the card or a connection failure with the reader during the transaction. In practice, this counter is incremented at each start of transaction then decremented each time that an end of transaction command is detected, e.g. GAC1 TC or AAC, GAC2 TC or AAC, RR of end of AFL: acceptance or refusal of transaction. If the transaction is interrupted, the counter therefore remains incremented.

On the other hand, if the transaction ends without interruption, the value of the counter is not incremented (this results from incrementation followed by decrementation). Thus, a large value for this counter means that the number of commands that have not resulted in a transaction is very large. If the value of this counter is high for a given card group, this may reveal a problem of configuration or attack on a card reader or a design problem of this card group e.g. in the adjustment of the antennas if the transactions are contactless. Without corroborating elements, it may be a matter of a card attacked in order to understand its operation and develop attacks by analyzing consumption or other information.

The sixth counter counts the number of offline (as opposed to online) transactions. This counter makes it possible to verify the consistency of the different counters, since the nature of the (online or offline) transaction may have an impact on the number of commands received. It also makes it possible to detect abnormal operations, e.g. a less efficient payment path due to inconsistencies in the sets of customized cryptographic keys in the reader and the card. A command for finding out whether the transaction is offline, e.g. a GAC1 TC or AAC (Application Authentication Cryptogram) command. Thus the sixth counter may count these commands.

The preceding examples are only embodiments of the invention.

The invention claimed is:

1. A method of managing a smart card configured for securing a transaction with an external device via a card reader, the method comprising the following steps:
   incrementing (E32) at least one command counter of commands received by the smart card during a transaction; and
   depending on a current value of said at least one counter and a command profile, implementing (E36) a smart card management command,
   wherein the step of incrementing implements multiple counters, each counter being associated with a command of a given type from a plurality of types of commands received by the smart card during the transaction.

2. The method according to claim 1, wherein the profile defines proportions or limit differences between the values of the different counters.

3. The method according to claim 1, wherein the profile defines, for at least one counter, a limit number of commands received by the smart card.

4. The method according to claim 1, further comprising:
   a step of writing each command received by the smart card during said transaction into a dedicated memory register.

5. The method according to claim 1, further comprising:
   a step of writing commands and/or transactions when at least one command counter exceeds a certain limit, into a dedicated memory register.

6. The method according to claim 1, wherein the management command consists in implementing a security countermeasure in the smart card.

7. The method according to claim 6, wherein the security countermeasure consists in interrupting the transaction or recording a dedicated indicator in a non-volatile memory of the smart card or in temporarily or permanently blocking the use of the smart card.

8. The method according to claim 1, wherein the smart card management command comprises updating the command profile or at least one application data item.

9. The method according to claim 1, further comprising:
   a step of sending, to a third entity, information relating to the current value of said at least one counter.

10. The method according to claim 9, wherein the smart card management command is instructed by the third entity in response to said information.

11. The method according to claim 1, wherein the management command consists in sending an update command to the card reader.

12. The method according to claim 1, further comprising:
    an initial step of configuring (E30) said command profile.

13. The method according to claim 8, wherein updating the command profile comprises receiving and executing at least one command of an update script defining the command profile or at least one application data item.

14. The method according to claim 1, further comprising:
    a step of identifying a removal of the card from the smart card reader before the end of the transaction.

15. A smart card configured for securing a transaction with an external device via a card reader, the smart card comprising a secure element configured for implementing the following steps:
    incrementing at least one command counter of commands received by the smart card during a transaction; and
    depending on a current value of said at least one counter and a command profile, implementing a smart card management command,
    wherein the step of incrementing implements multiple counters, each counter being associated with a command of a given type from a plurality of types of commands received by the smart card during the transaction.

16. The method according to claim 12, wherein configuring the command profile comprises receiving and executing at least one command of a configuration script defining the command profile or at least one application data item.

17. The method according to claim 1, wherein the step of incrementing consists in counting all the commands received by the smart card during the transaction.

18. The method according to claim 15, wherein the step of incrementing consists in counting all the commands received by the smart card during the transaction.

19. A method of managing a smart card configured for securing a transaction with an external device via a card reader, the method comprising the following steps:
    incrementing at least one command counter of commands received by the smart card during a transaction, wherein all the commands received by the smart card during the transaction are counted;
    writing each command received by the smart card during the transaction into a dedicated memory register; and
    depending on a current value of said at least one counter and a command profile, implementing a smart card management command.

* * * * *